US 6,462,824 B1

(12) United States Patent
McLean et al.

(10) Patent No.: US 6,462,824 B1
(45) Date of Patent: Oct. 8, 2002

(54) SNAP FIT MAGNETIC SHIELDS FOR LASER GYROSCOPES

(75) Inventors: Thomas McLean, Woodland Hills; Eric L. Goldner, Valencia; Michael J. Tweedy, Sim Valley, all of CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/538,932

(22) Filed: Mar. 31, 2000

Related U.S. Application Data

(60) Provisional application No. 60/170,986, filed on Dec. 15, 1999.

(51) Int. Cl.[7] .............................................. G01C 19/72
(52) U.S. Cl. ....................................... 356/459; 356/465
(58) Field of Search ................................ 356/459, 460, 356/465; 372/94

(56) References Cited

U.S. PATENT DOCUMENTS

| | | | | |
|---|---|---|---|---|
| 4,425,040 A | * | 1/1984 | Ljung et al. | 356/472 |
| 5,486,922 A | * | 1/1996 | Cordova | 356/465 |
| 5,896,199 A | * | 4/1999 | Mark et al. | 356/465 |
| 6,259,849 B1 | * | 7/2001 | McLean et al. | 356/460 |

* cited by examiner

Primary Examiner—Samuel A. Turner
(74) Attorney, Agent, or Firm—Lewis B. Sternfels

(57) ABSTRACT

Interconnection mechanisms for a laser gyroscope assembly (10) enable it to be rapidly and non-harmfully assembled and disassembled prior to a more durable interconnection, to facilitate repair and rework. The assembly includes a fiber optic spool (12), an inner shield (16) and an outer shield (18), which are formed of a stress-annealed magnetic and generally malleable material. The outer shield comprises upper and lower portions or parts (30, 32) whose first and second end segments (62, 66) respectively terminate the portions. Segment (66) has angled intersecting conical surfaces (74, 76) which engage surfaces (65, 67) on segment (62). Stops (80, 83) are formed respectively on the ends of the segments so that a distal end (68) contacts an interior ledge surface (80) of outer shield (34), thereby to limit the mutual engagement and to center the segment configuration interfit. The position and location of the stop allows the intersecting edges of surface (65, 67) of outer shield (34) to precisely contact reverse taper segment (76) of surface (70) at a point beneath intersection (78) to ensure positive retention and mechanical locking of the upper and lower portions of outer shield (18). A plurality of notches (84) are positioned evenly about the periphery of the lower portion of the outer shield at its intersection of the upper portion. Tangs (90, 92) of a tool (88) are inserted in seriatim within the spaces for gradual disassembly of the upper and lower outer shield portions without harm thereto. Inner shield (16) includes a cover (28) having two pairs of projections (130, 132) which can snap together, and a top annular segment (126) which is engageable with a centering projection (138) on end (26) of the spool. When the cover is secured to the spool, the top annular segment is flexed, but not deformed, to provide a spring bias and positive retention and, consequently, a solid and chatter-resistant engagement in a robust mechanical connection even under severe dynamic environments.

18 Claims, 3 Drawing Sheets

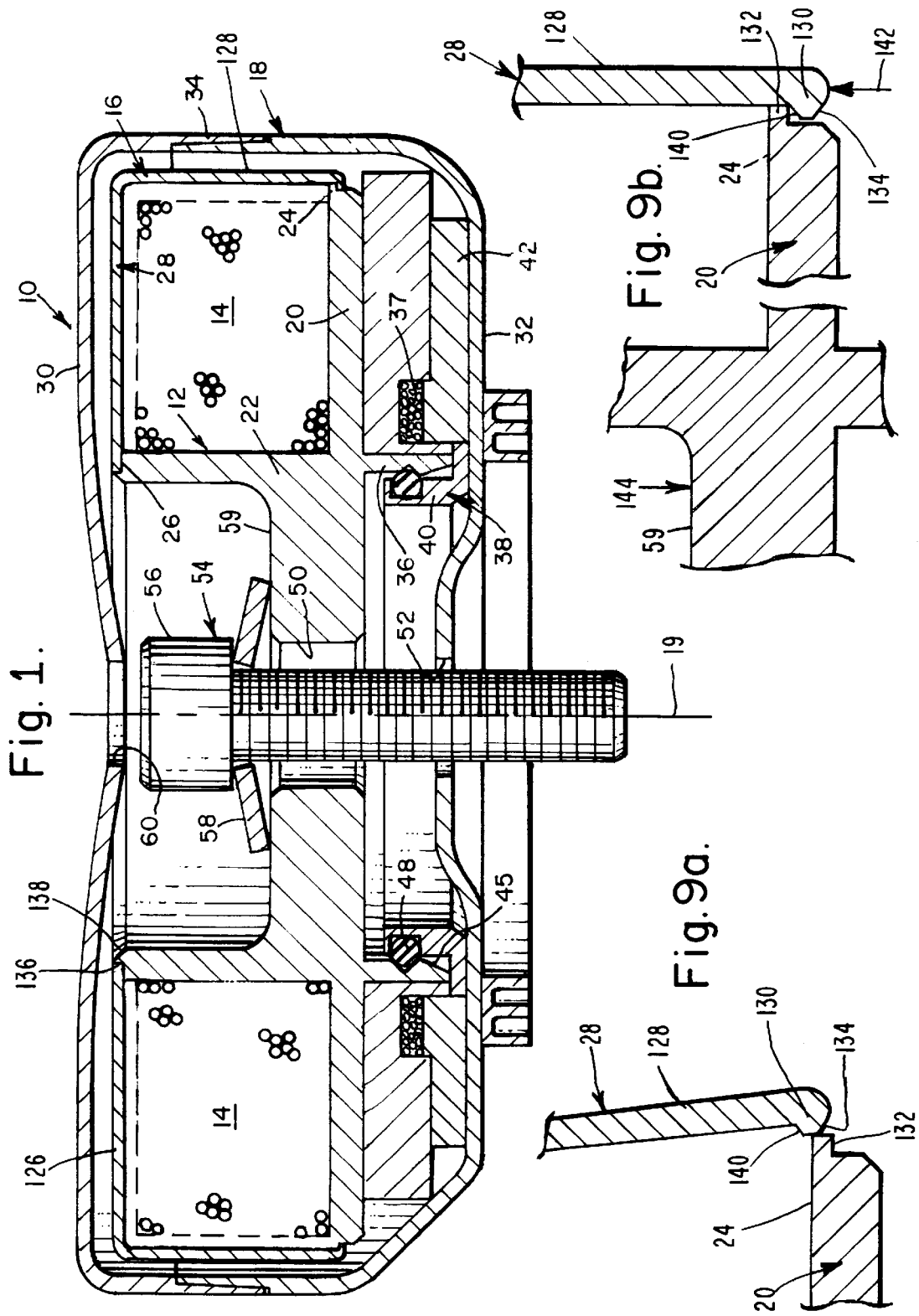

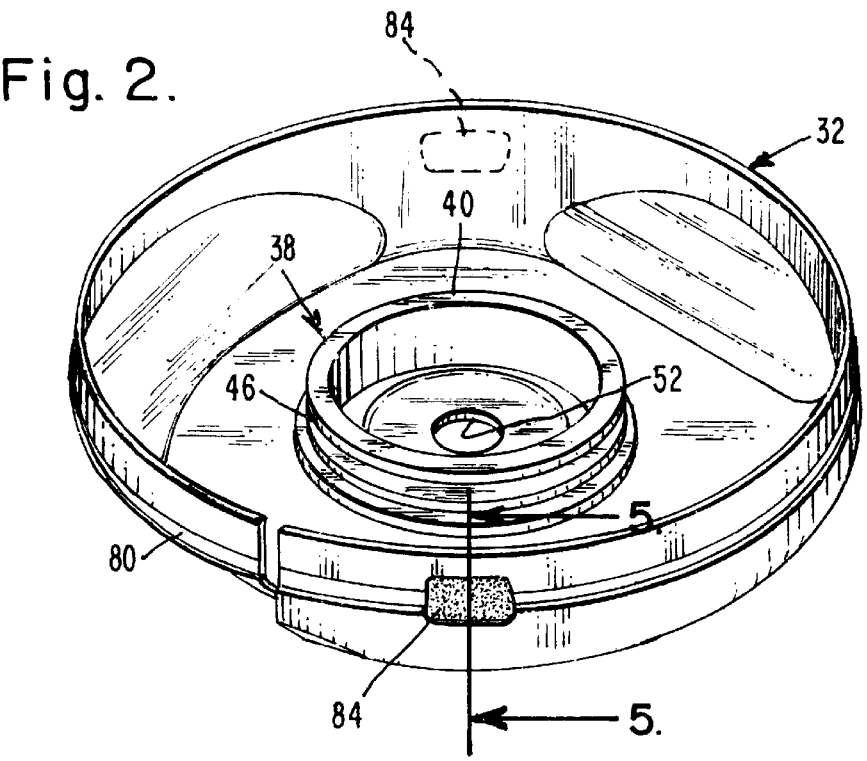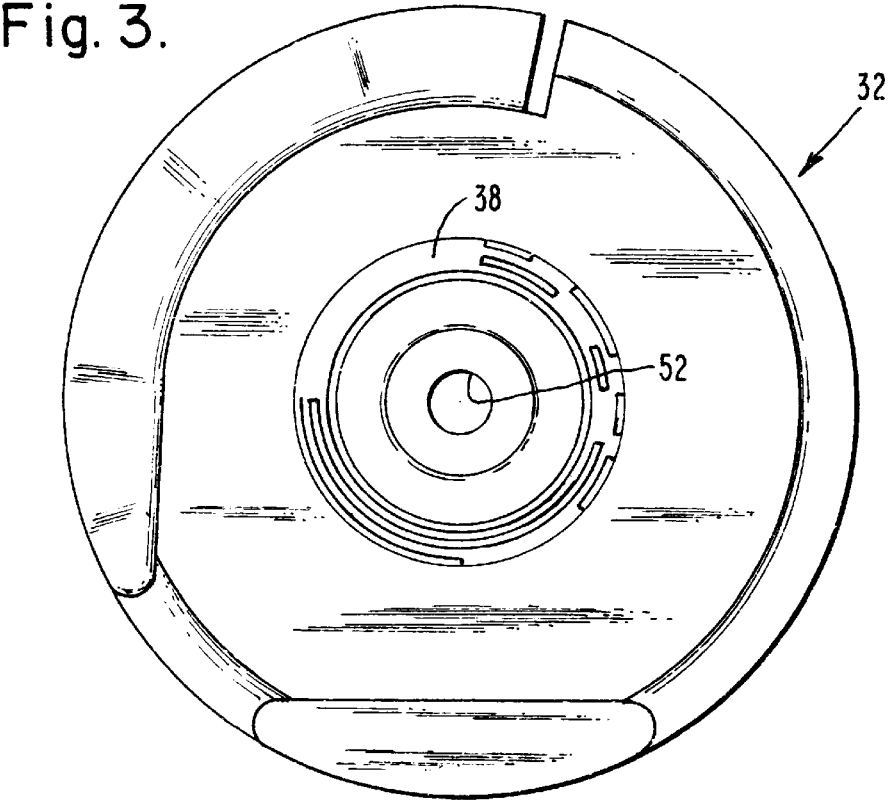

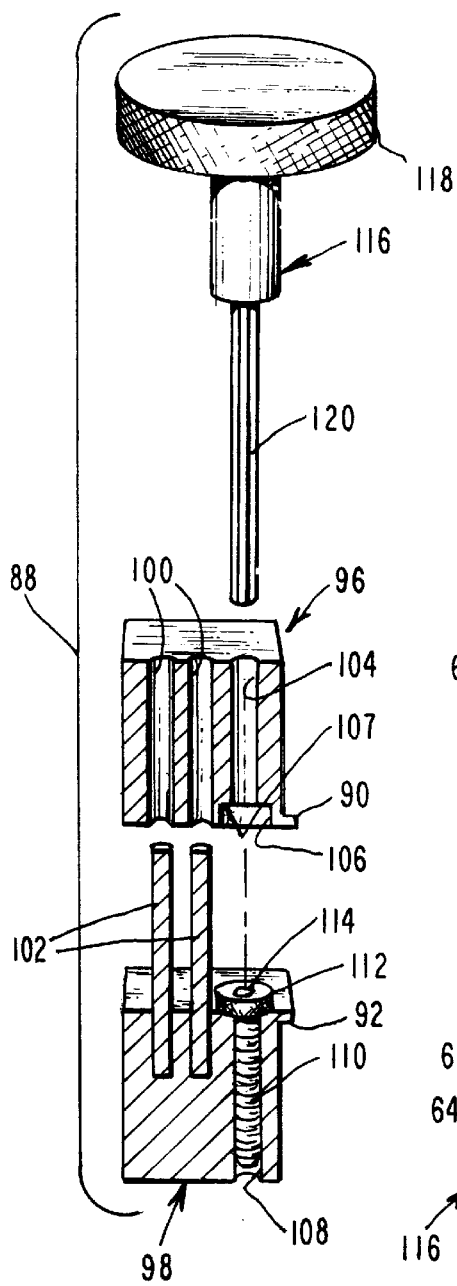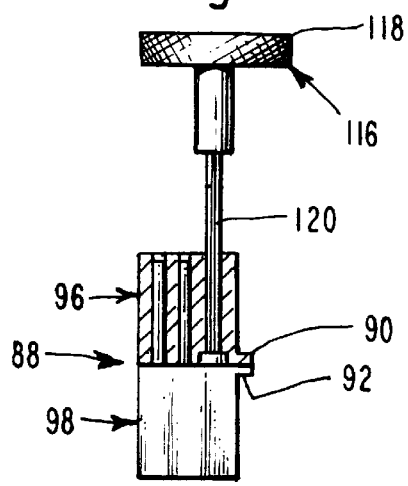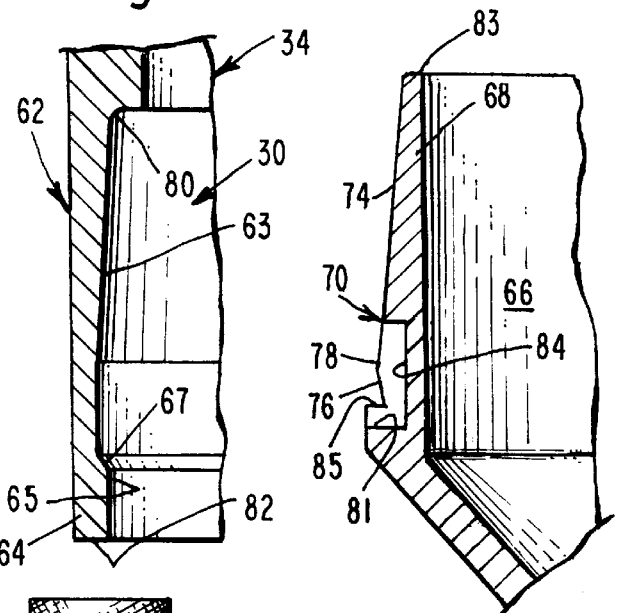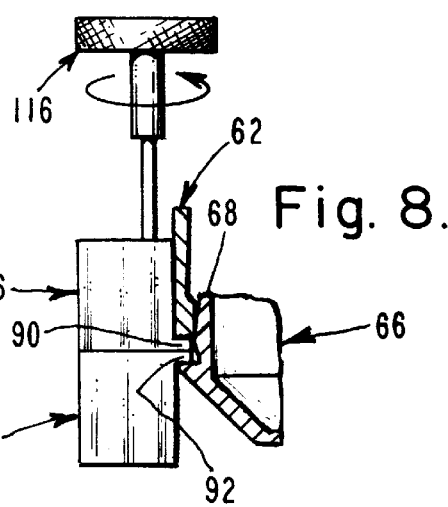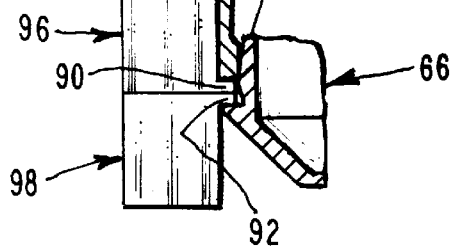

SNAP FIT MAGNETIC SHIELDS FOR LASER GYROSCOPES

CROSS-REFERENCE TO RELATED APPLICATION

This application claims the benefit of U.S. Provisional Application No. 60/170,986, filed Dec. 15, 1999.

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to laser gyroscopes such as solid state fiber optic gyroscopes and ring laser gyroscopes and, more particularly, to an interconnection in a housing for such gyroscopes for maintaining the magnetic shielding properties of the housing.

2. Description of Related Art and Other Considerations

The present invention is generally applicable to laser gyroscopes, such as solid state fiber optic gyroscopes and ring laser gyroscopes. Both provide paths for directing travel of coherent laser light. In the former, optical fibers in a housing provide the paths. In the latter, travel is provided within a lasing chamber which comprises a laser housing having bores and mirrors positioned where the bores change direction. One problem relating to such laser gyroscopes involves polarization changes due to the Faraday effect, also termed Faraday rotation. This problem can arise when the magnetic shielding about the housing is inadequate, that is, magnetic flux leaks into to housing, with the result that magnetic lines contaminate or interfere with the traverse of the coherent light about its path.

Because the present invention was conceived to address problems relating to fiber optic gyroscopes, the following exposition will be directed thereto; however, it is to be understood that the present invention is as applicable to ring laser gyroscopes and similar instrumentation utilizing coherent radiation and the specific problems solved by the invention described herein.

Accordingly, a fiber optic gyroscope of the type encompassed by the present invention typically comprises an assembly which includes, among other elements, a coil of optical fiber mounted on and secured to a spool, and magnetic shielding enclosing the fibers. Such magnetic shielding may include the spool itself and a cover secured to the spool to form a magnetically protective housing or inner shield enclosing the coil. An outer or external shield is placed over this inner shield protective housing, with proper separation provided by a spacer ring to further enhance the magnetic shielding about the optical fiber coil. For some inertial navigation applications, a combined shielding factor (magnetic field attenuation) on the order of $10^4$ may be required. In prior art constructions, the separate shields are typically are bonded together, through the intermediary of a spacer ring, to provide a fully assembled gyroscopic instrument. This assembly is then bolted to a stable support member, such as an inertial sensor block. Because the bonding of both the inner and outer shields is of a generally permanent nature, it is difficult to dismantle the assembly, such as for rework or repair. Such rework often occurs during early production, when it is needed to open the assembly, which may occur when minor failures need repair. Rework of such an assembly may result in damage or failure to the shield and/or its contents.

In the above-described construction, both the inner and outer shields are formed of a high magnetic permeability material, which is subjected to a stress annealing process to enhance and maximize its magnetic permeability. Such shields comprise a ferromagnetic material having high relative permeability ($\mu/\mu_0$). Preferred high permeability materials include alloys, for example, of Carpenter High Permeability "49"® and Carpenter HyMu "80"® (trademarks of Carpenter Technology Corporation) whose compositions are respectively a 48% nickel-iron alloy and an unoriented 80% nickel-iron-molybdenum alloy.

The shields, when properly annealed, are generally malleable and, therefore, are subject to damage. They are strain and impact sensitive and, should the assembly be dropped, bent, dented, or even mishandled or slightly deformed, the magnetic permeability will be compromised and, thus, the magnetic shielding invariably will be deleteriously affected. Such mishandling or mishap can occur during the above-mentioned dismantling and disassembly, e.g., for repair and rework, when the inner and outer shields must be separated. Such dropping, bending, denting or mishandling can cause the assemblies, that is, the shields and their contained fiber optics and associated parts, to be destroyed and, therefore, they need replacement.

Another problem, to which the present invention provides a solution, relates to the connections between the respective parts of the inner and outer shields. The current practice of manufacturing the inner shield is to bond or weld, for example, the inner shield cover to an inner shield base or the optical fiber supporting spool. The outer shield assembly comprises upper and lower shield portions which must be bonded, welded or screwed together. Gaps at the joined portions deleteriously affect the magnetic flow path. These joining techniques also present other disadvantages and problems. For example, the bonding process is subjected to high labor costs and tight process controls. Both bonded and welded joints suffer from the difficulty, if not impossibility of rework, and the resulting scrapping of welded parts. Use of threaded parts requires the use of extremely tight, expensive machining tolerances, and the threads can gall, thus making rework difficult, if not impossible.

Further, the joint must be solid and robust, that is, free from movement between the portions over wide temperature excursions and vibration conditions, to prevent rattling during vibration which would harmfully affect operation of the gyroscope.

SUMMARY OF THE INVENTION

These and other problems are successfully addressed and overcome by the present invention by an elastic interference fit positioned between the cover and spool of the inner shield and between the upper and lower portions of the outer shield. In the preferred embodiment, this yieldable interference fit comprises a snap-fittable or spring-like biased joint engagement between the respective parts. Although they are subject to deformation, bending of the inner shell cover and the outer shield portions are within the elastic limits of the shield material, so that the deformation will not become permanent and affect their magnetic performance.

Several advantages are provided by this arrangement. Principally, deformation of the parts, but within their elastic limits, prevents loss of magnetic shielding over the course of repeated assembly and disassembly of the fiber optic gyroscope. Wide dimensional tolerance stamping with light touch-up machining is possible. Repair and rework is facilitated without damage to the shield or internal components. Labor costs for assembly and rework are reduced. Scrap is decreased, with corresponding savings in parts and materials.

Other aims and advantages, as well as a more complete understanding of the present invention, will appear from the following explanation of exemplary embodiments and the accompanying drawings thereof.

BRIEF DESCRIPTION OF THE DRAWINGS

FIG. 1 is a cross-sectional view of a fiber optic gyroscope including its two part inner and outer shields and other components, in which the inner and outer shields are each secured together by preferred embodiments of the present invention comprising a snap fit connection;

FIG. 2 is an isometric view of the lower portion of the outer shield illustrated in FIG. 1;

FIG. 3 is a bottom view of the under side of the lower portion of the outer shield illustrated in FIG. 2;

FIG. 4 is an enlarged view of the end of the outer shield upper portion depicted in FIG. 1;

FIG. 5 is an enlarged view of the outer shield lower portion, on a slightly smaller scale than that illustrated in FIG. 4, taken along line 5—5 of FIG. 2, showing a notch in the lower portion used to separate it from the upper portion of the shield;

FIGS. 6 and 7 are isometric and side cross-sectional views in partial cross-section of a tool useful in separating the upper and lower portions of the outer shield without damage thereto;

FIG. 8 illustrates the use of the tool depicted in FIGS. 6 and 7 for separating the two parts of the outer shield without harm thereto; and FIGS. 9a and 9b illustrate enlarged views of the snap fit connection between the cover of the inner shield and the optical fiber supporting spool shown in FIG. 1, and the manner in which this connection is effected.

DETAILED DESCRIPTION OF THE PREFERRED EMBODIMENTS

As depicted in FIG. 1 but see also FIGS. 2 and 3, a gyroscopic assembly 10 comprises a spool 12, an optical fiber coil 14 secured to and supported by the spool, an inner shield 16, and an outer or external shield 18, all generally lying concentric about an axis 19. The spool includes a base 20 and a tubular wall 22 extending perpendicularly from the base to form an annularly shaped seat for supporting coil 14. Base 20 and wall 22 terminate in respective ends 24 and 26 to which a cover 28 is secured. Inner shield 16 is therefore defined by base 20, tubular wall 22 and cover 28. Outer shield 18 is formed from upper and lower shield portions 30 and 32, which are secured together at an interface 34.

Spool 12 further includes a downwardly extending tubular wall 36 which forms, with base 20, an annularly shaped construction for supporting additional optical fibers and electrO-optic devices 37 therefor, which are not germane to the present invention and, therefore, which will not be further discussed herein.

As also detailed in copending application, Ser. No. 09/302,705, filed Apr. 29, 1999, whose inventors are the same as those of the present invention, a spacer ring 38 of a non-magnetic composition is secured to lower portion 32 of the outer shield, and includes an upwardly extending annular wall 40 which extends within downwardly extending annular wall 36 of the spool in a non-contacting, concentric manner. An optics carrier lid 42, preferably of a composite, flexible material such as a urethane foam, is positioned to close off the annularly shaped seat defined by downwardly extending tubular wall 36 and base 20.

Downwardly extending tubular wall 36 and upwardly extending annular wall 40 are provided with respective annularly configured grooves 44 and 46 into which an O-ring 48 resides to secure spool 12 and lower portion 32 together. Tubular wall 36 incorporates a tapered portion 45 that produces a centering function for insertion and facilitates the O-ring engagement into groove 44 while preventing any damage to the O-ring. O-ring 48 also serves to center the spool within outer shield 18, and avoids metal-tO-metal contact therebetween. Groove 44 has a V-shaped configuration into which the O-ring can fit, while groove 46 has a U-shaped configuration to act as a retainer for the O-ring before and after assembly of the spool and outer shield. The grooves may be configured to have rounded edges further to protect the O-ring from damage.

Spool 12 and lower portion 32 of outer shield 18 are provided respectively with aligned central openings 50 and 52 centrally positioned on axis 19, through which a cap screw 54 extends. A head 56 on the cap screw sandwiches a conical spring washer 58 between it and a surface 59 on spool 12. The conical spring washer ensures that a preload is maintained over excursions in temperature. An opening 60 in upper portion 30 of outer shield 18 provides access to cap screw 54 for tightening and loosening the cap screw. Opening 60, however, is smaller in diameter than that of the head of the cap screw so as to capture it within outer shield 18. The cap screw enables assembly 10 to be firmly secured to a support.

Inner and outer shields 16 and 18 are both formed of a high magnetic permeability material, which is stress annealed to enhance and maximize the magnetic shielding properties of assembly 10. The enhanced properties protect fiber optic coil 14 and its associated optical and electrO-optic components from the effects of magnetic interference. Specifically, the inner and outer shields both act as paths to direct possibly deleterious magnetic fields around the parts housed with the shields.

The annealing process also renders the shields generally malleable and, therefore, they are easily subject to damage. They are thus strain and impact sensitive and, should the assembly be damaged, e.g., by being dropped, bent, dented or even mishandled or slightly deformed, the magnetic shielding properties will be compromised and, consequently, the magnetic properties invariably will be deleteriously affected. Such mishandling or mishap can occur during the above-mentioned dismantling and disassembly, e.g., for repair and rework, when the inner and outer shields must be separated. Such dropping, bending, denting or mishandling may cause the assemblies, that is, the spools and their contained fiber optics and associated parts, to be destroyed and, accordingly, they need to be replaced. Therefore, it is important that, when rework and repair is required, which is often during the manufacture of assembly 10, it is critical to protect the assembly from such damage. The use of the snap fit interconnections incorporated in inner and outer shields 16 and 18, as well as O-ring 48 in grooves 44 and 46, enable the assembly to be easily disassembled and re-assembled with little potential of harm.

Referring specifically to FIGS. 4 and 5, joint 34 of outer shield 18, which is formed by the interconnection between its upper and lower portions 30 and 32, is designed also to avoid harm when outer shield 18 is opened for disassembly and re-assembly of assembly 10. This design ensures separation of the upper and lower shield portions from one another without any deformation thereof, especially in view of the relative malleability of the materials of which they are constructed. Accordingly, as shown in FIG. 4, upper shield portion 30 terminates in an end segment 62 having a distal end 64 and, as shown in FIG. 5, lower shield portion 32 terminates in an end segment 66 having a distal end 68. The segments have mutually overlapping elastic configurations which form an interfittable engagement therebetween (joint 34) and which are so fashioned as to permit the engagement without exceeding the elastic limit of the constituent material compositions of the segments. Specifically, the segment configurations have respective interfitting but slightly different shapes. End segment 62 has a generally conical inner surface 63 which is sloped away from an imaginary tubular surface, that is parallel to assembly axis 19, as extending towards distal end 64, and which terminates in an annular ledge 65 which is joined to surface 63 by a joining annular surface 67. End segment 66 is shaped to provide a generally convex surface 70. The convex surface comprises a pair of intersecting conical surfaces 74 and 76 angled preferably at 4° from their intersection 78 with respect to assembly axis 19. It is to be understood that any angle other than 4° may be employed, the criticality being a sufficiently steep angle to enable rapid engagement of surfaces 74 and 65, and a sufficiently shallow angle to strain both shield parts, but without harm thereto. Stops on ledges 80 and 83 are formed respectively on segments 62 and 66 to contact and limit the mutual engagement and to center the segment configuration interfit. The position and location of the stop allows the intersecting edge of surfaces 65 and 67 of outer shield 18 to precisely contact reverse taper segment 76 of surface 70 at a point below intersection 78 to ensure positive retention and mechanical locking of the upper and lower portions of outer shield 18. These parts are so dimensioned that a very small gap lies between distal end surface 82 of segment 62 and a ledge 85 in each of notches 84. A small space also lies between ledges 81 and 85 for reception of the tangs of an outer shield separating tool to be described hereinafter with respect to FIGS. 6–8.

To ensure that upper and lower portions 30 and 32 will be separated from one another without permanent deformation or other damage to them, segment 66 is formed with at least two notches 84 evenly placed about its periphery. A tool 88, illustrated in FIGS. 6 and 7, is useful in separating the portions. The tool includes tangs 90 and 92 which are fittable within the space formed by ledge 81 of segment 68 and bottom edge 82 of segment 62. The tangs are constrained in tool 88 to move towards and away from one another in a linear manner, without any pivoting with respect to one another. This constraint is provided by a pair of holders 96 and 98. Holder 96 has a pair of cylindrically-shaped guide holes 100 in which a pair of guide pins 102, press fitted in and extending from holder 98, are adapted to fit and slide. A third hole 104, which extends parallel to holes 100, is provided in holder 96 and terminates in a slightly enlarged cylindrical relief 106. Holder 98 further includes a threaded opening 108, within which a cap screw 110 is threaded. A socket head 112 terminates cap screw 110, is disposed to reside within relief 106 in holder 96, and is provided with a hexagonal opening 114. A driver 116, having a knurled head 118 and a hexagonally shaped shaft 120, extends through hole 104 in holder 96 for engagement at its end with hexagonal opening 114 in cap screw socket head 112, to rotate cap screw 110. Such rotation causes the cap screw to linearly move holder 98 towards and away from holder 96, depending upon the clockwise or counterclockwise rotation imparted to the cap screw, as socket head 112 pushes against face 107 of holder 96.

In operation, as shown in FIG. 8, tool 88 is used in seriatim with the several notches in lower shield portion 32 of outer shield 18. Tangs 90 and 92 are inserted into the space within each notch, with one tang contacting surface 82 of upper shield 30 and the other tang contacting surface 81 of notch 84 in lower shield 32. Gentle turning of the tool causes the tangs to separate and thereby to gently separate the shield portions from one another. By placing the tangs of tool 88 alternately within the several notches, shield portions 30 and 32 can be gradually separated in steps without harm thereto.

An alternative method of separating the assembled outer shield utilizes tooling which radially squeezes lower shield 32 inwardly, without imparting a permanent deformation thereto, until it elastically bends radially inwardly sufficiently to enable the upper shield to be easily removed therefrom.

Referring now to FIGS. 1, 9a and 9b, cover 28 of inner shield 16 includes a top washer-shaped segment 126 and a tubular side segment 128 secured generally at slightly greater than a right angle thereto after installation. An inwardly directed annular projection 130 is formed at the edge of the side segment and is disposed to snap over an outwardly directed annular projection 132 projecting from end 24 of base 20 of the spool. A sloped annularly shaped surface 134 on projection 130 facilitates a lead-in for alignment and mutual engagement and a snap fitting of the cover onto the spool.

Top annular segment 126 includes an annular aperture 136, which is disposed to engage a centering projection 138 projecting from spool wall end 26, which provides a lead-in for engagement, and serves in part to center the inner shield cover with respect to the spool and, therefore, the optical fiber coil. In addition, top annular segment 126 which is normally flat in its free state, becomes flexed when tubular side segment 128 is pushed downward to engage and fit over lip 132. Flexed annular segment 126 is designed to remain within the elastic limits of the shielding material and will provide a spring bias when cover 28 is secured to spool 12 to maximize shielding effectiveness and to prevent rattling due to vibratory forced exerted on assembly 10. Accordingly, positive retention is assured upon engagement between projections 130 and 132 and between annular aperture 136 and centering projection 138. Through these engagements, a deflection and the resulting spring bias of top annular segment 126 produces a solid and chatter-resistant engagement of cover 28 on spool 12 and, thus, results in a robust mechanical connection even under severe dynamic environments. This arrangement accordingly enables the shield to be simply snapped into place for assembly.

For disassembly of inner shield 16, the end of cover 28 is provided with an annularly shaped sloped surface 140, which is sloped in a direction opposite from that of surface 134. A ring-shaped tool, as represented by arrow 142, has a diameter which conforms to that of tubular side segment 128 of cover 28. When tool 142 is pressed upwardly with a force against projection 130 in a direction opposite from a force exerted on surface 59 of spool 12, as represented by arrow 144, annularly shaped surface 140 is cammed against and outwardly and over projection 132 on spool end 24 to effect a gentle and non-damaging separation of cover 28 from spool 12. Upon removal, both tubular side segment 128 and top annular segment 126 return to a flat and perpendicular shape as a result of safely operating within the elastic region of the shielding material with no permanent deformation.

Although the invention has been described with respect to particular embodiments thereof, it should be realized that various changes and modifications may be made therein without departing from the spirit and scope of the invention.

What is claimed is:

1. In an optical gyro assembly including means defining clockwise and counterclockwise paths for directing travel of coherent laser light and a shield of deformable ferromagnetic material having given magnetic properties for protectively enclosing the path means, in which deformation of the shield can deleteriously affect its magnetic properties, a mechanism for assembling and disassembling the shield without deleteriously affecting the magnetic properties, comprising:

first end segment means terminating a first part of said shield;

second end segment means terminating a second part of said shield; and said segment means having mutually engaging elastic configurations which form an interfittable engagement therebetween, said configurations being so fashioned as to permit the engagement without exceeding the elastic limit of the constituent material compositions of said segments.

2. An optical gyro assembly according to claim 1 in which at least one of said segment means configurations is provided with a generally formed convex shape and the other of said configurations is provided with an inter-engaging shape.

3. An optical gyro assembly according to claim 2 in which said convex and inter-engaging shaped configurations comprise a pair of intersecting planes angled at 4° from their intersection.

4. An optical gyro assembly according to claim 2 further including stops formed respectively on said segment means for contact with the distal ends of their corresponding mating parts to limit the mutually engaging elastically flexible configurations and to delimit said segment configuration interfit.

5. An optical gyro assembly according to claim 2 further including means defining at least one space positioned between said segment means for enabling engagement with a tool having means insertable within said space means for enabling gentle separation of said shield parts without harm thereto and thereby to prevent any bending beyond their elastic limits.

6. An optical gyro assembly according to claim 5 wherein said space means comprise a plurality of said space means evenly distributed about the periphery of said shield parts.

7. An optical gyro assembly according to claim 1 wherein said shield comprises a spool supporting a fiber optic coil and a cover having means for providing a mechanical coupling therebetween, within which said first and second end segment means are included.

8. An optical gyro assembly according to claim 7 in which:

said spool includes a base and a tubular wall angularly extending therefrom for providing a recess for supporting said fiber optic coil;

said cover includes a washer-shaped segment and a tubular side segment angularly extending therefrom; and said coupling means comprise a pair of inter-engageable latchable projections respectively terminating said spool base and said cover tubular side segment, and said spool tubular wall and said cover washer-shaped segment.

9. An optical gyro assembly according to claim 8 in which said cover washer-shaped segment is deflectable within its prescribed elastic limits towards said spool base to form a spring bias when inter-engaged with said spool base.

10. In a multi-part shield for enclosing means defining clockwise and counterclockwise paths for directing travel of coherent laser light in a fiber optic gyroscope and for protecting the path means from error producing electromagnetic disturbances, which shield is formed from deformable ferromagnetic material having given magnetic properties and in which deformation can deleteriously affect its magnetic properties, a joining mechanism for joining the parts without such deleterious affect, comprising:

a first shield part having a joining segment;

a second shield part having a joining segment; and a yieldable interference fit intercoupling said first and second joining segments together.

11. In an optical gyro assembly having a fiber optic coil and shielding therefor formed of deformable stress annealed high magnetic permeability material that protects said fiber optic coil from said effects of spurious signal interference, said improvement for protecting said shielding from deformation and a consequent degradation of its magnetic properties, comprising:

a spool including a base and a tubular wall extending generally at right angles therefrom for providing a recess for supporting a fiber optic coil;

a cover, including a tubular side segment having an annular end and a washer-shaped segment extending generally at right angles therefrom, covering said spool to form therewith an inner shield for inclosing the fiber optic coil;

an outer shield coupled to said spool and enclosing said inner shield;

said inner and outer shields being formed of the deformable ferromagnetic material, both for protecting the fiber optic coil from the effects of spurious signal interference; and a first pair of inter-engageable latchable projections, respectively terminating said ends of said spool base and said cover tubular side segment, comprising an inwardly directed annular projection formed at said end of said side segment and disposed to snap over said outwardly directed annular projection projecting from said end on said spool base, and a sloped surface on said tubular side segment projection to facilitate mutual engagement and a snap fitting of said cover onto said spool; and a second pair of inter-engageable latchable projections, terminating said ends of said tubular wall of said spool and said washer-shaped segment of said cover, comprising means, defining an annular aperture in said washer-shaped segment, disposed to engage said projection projecting from said tubular wall end of said spool, to center said inner shield cover with respect to said spool and, therefore, with respect to said optical fiber coil, said washer-shaped segment being flexed towards said spool base to provide a spring bias when said cover is secured to said spool to assure positive retention therebetween upon engagement between said first and second pairs of projections and to provide a deflection of said washer-shaped segment and a spring bias which produces a solid and chatter-resistant engagement of said cover on said spool, thereby resulting in a robust mechanical connection even under severe dynamic environments.

12. In an optical gyro assembly including means defining clockwise and counterclockwise paths for directing travel of coherent laser light and a shield having at least two parts of deformable ferromagnetic material having given magnetic properties for protectively enclosing the path means, in which deformation of the shield can deleteriously affect its magnetic properties, a method for joining the shield parts without deleteriously affecting the magnetic properties, comprising the steps of:

terminating a first of the parts in a first end segment means;

terminating a second of said parts in a second end segment means; and interfitting the segment means in a yieldable interfittable engagement therebetween, while limiting the engagement from exceeding the elastic limit of the constituent material compositions of the segment means.

13. A method according to claim 12 further comprising the step of providing the segment means with shapes which respectively are generally formed in a convex configuration and in a generally inter-engaging configuration.

14. A method according to claim 13 in which said providing step comprises the step of interfitting the segment means configurations on a bowed surface.

15. A method according to claim 14 in which said interfitting step comprises the step of forming the bowed surface as a pair of intersecting planes angled at 4° from their intersection.

16. A method according to claim 14 further including the step of limiting the mutual engagement in order to center the segment means configuration interfit.

17. An optical gyro assembly according to claim 12 in which the path means comprises a fiber optic coil and in which said terminating steps include the steps of:

supporting the fiber optic coil on a spool, defining a first of the parts, and having a base and a tubular wall angularly extending therefrom; and coupling a cover, defining a second of the parts, and including a washer-shaped segment and a tubular side segment angularly extending therefrom, to the spool and enclosing the fiber optic coil therein;

said coupling step comprising the step of inter-engaging latchable means respectively terminating the spool base and the cover tubular side segment, and the spool tubular wall and the cover washer-shaped segment.

18. An optical gyro assembly according to claim 17 further including the step of imparting the cover washer-shaped segment with a spring bias when inter-engaged with the spool tubular base.

* * * * *